2,870,120
PRODUCTION OF VINYL SILOXANE POTTING COMPOUNDS

Milton Yusem, Chicago, Ill., assignor, by mesne assignments, to the United States of America as represented by the Secretary of the Navy No Drawing. Application May 31, 1956
Serial No. 588,575

1 Claim. (Cl. 260—46.5)

The present invention relates to polysiloxane compositions containing both silicon-bonded vinyl radicals and silicon-bonded monovalent hydrocarbon radicals. In particular the invention is directed to the production of silicone compositions which are capable of being thermoset for use as a potting compound.

The term "polysiloxane," as used herein refers to compositions of matter having a skeletal structure consisting essentially of alternate atoms of silicon and oxygen. The structure resulting from the silicon-oxygen-silicon linkages may be either of a cyclic or straight-chain or branched-chain type, or any combination of one or more of these types resulting from cross-linking of the basic units at one or more points by additional silicon-oxygen-silicon linkages to form a network structure. Various hydrocarbon-substituted polysiloxane compounds have heretofore been known. In general, these silicon bonded monovalent radicals are saturated aryl or saturated alkyl radicals.

The polysiloxanes of the present invention are distinguished from the polysiloxanes known heretofore by the fact that part of the silicon-bonded hydrocarbon radicals, particularly the saturated hydrocarbon radicals, are substituted by short-chain, monovalent, terminally unsaturated alkenyl radicals, specifically, vinyl radicals, so that further polymerization of the polysiloxanes can be effected through these unsaturated radicals. The vinyl radicals may be substituted on silicon atoms which have no other organic radical attached thereto, or the vinyl radicals may be attached to silicon atoms which also contain a non-vinylic hydrocarbon radical, e. g. methyl, phenyl, etc. By substitution of the vinyl radicals for minor proportions of the silicon-bonded monovalent hydrocarbon radicals of the known polysiloxanes, particularly useful products can be obtained having the characteristic properties of the polysiloxane structure and the added advantage resulting from the capacity of the vinyl substitutes to undergo organic polymerization with the formation of larger molecules. In general, although allyl groups attached to silicon appear to be more reactive toward polymerization than the vinyl groups, with which the present invention is concerned, it has been found that under equivalent molar concentrations of vinyl and allyl groups, the remaining structure of the organopolysiloxane being essentially the same, the heat-stability of organopolysiloxanes containing vinyl groups is better than the heat-stability of organopolysiloxanes in which allyl groups are present in place of vinyl groups.

The principal advantages of the present invention will be more apparent from a consideration of the usual methods of preparing polysiloxanes. Polysiloxanes are dehydration products of hydrocarbon-substituted silanols, which are normally prepared by hydrolysis of silane derivatives or mixtures of such silanes of the formula $R_nSiX_{4-n}$ wherein $n$ is a number from 1 to 3, R represents a monovalent hydrocarbon radical and X represents a hydrolyzable group, such as a halogen atom, an alkoxy radical or the like. In the preparation of polysiloxanes, particularly the resinous and other high molecular weight materials, the characteristics of the fully condensed products are primarily dependent on the particular silane or silanes employed as starting materials, i. e. the nature and average number of silicon-bonded R groups so that the final products will be either liquid or resinous depending on the average R/Si ratio of the silicol or silicols. The principal reaction involved in the preparation of the polysiloxanes subsequent to the hydrolysis of the starting materials is the condensation or equilibration of the silicols.

The present invention offers an additional means for converting polysiloxanes to higher molecular weight products. For example, in accordance with the present invention, it is possible to prepare relatively stable polysiloxanes in a completely or substantially completely condensed state which can be converted to higher molecular weight products by effecting polymerization through the vinyl groups attached to silicon atoms. Alternatively, the final setting up of partially condensed resin-forming polysiloxanes, which is a relatively slow process when obtained only by means of the condensation reaction, can be greatly accelerated by the concomitant polymerization of silicon-bonded vinyl radicals. In addition to their shorter curing time, as compared with the known alkyl or aryl polysiloxanes, the vinyl-substituted polysiloxanes possesses the further advantages of curing at lower temperatures and of losing less weight during cure due to evaporation of low molecular weight components.

Advantages of the present invention will become apparent from a consideration of the example given below. This example is directed to the preferred method of preparing hydrocarbon substituted polysiloxane compositions containing a minor proportion of the silicon-bonded hydrocarbon radicals as vinyl radicals and involve the method steps of:

(1) Preparing a linear dimethyl silicone containing 2 mol percent vinyl methyl siloxane by hydrolysis.

(2) Equilibration or condensing the fluid silicone oil to a viscous pourable oil by using strong sulphuric acid at room temperature.

(3) Removal of low molecular weight silicones by solvent extraction and vacuum evaporation.

(4) Thermosetting the resulting silicone oil by use of a peroxide catalyst.

*Example*

A viscous, pourable silicone oil, having a viscosity of about 8000 centipoises at room temperature, was obtained by combining the following steps:

(1) Hydrolysis, by means of a 2:1 by volume water-dioxane mixture, which is added dropwise over a period of several hours, to the following mixture:

Dimethyl dichloro silane _____ grams__ 1100
Vinyl methyl dichloro silane _____ do____ 20
Dioxane _____ cc.___ 1100

(2) After addition of the 2:1 by volume of water-dioxane mixture and standing for several days, additional water and a mixture of toluene and water were added. By agitation, the linear dimethyl silicone, containing two mol percent vinyl methyl siloxane, was transferred to the toluene layer. The toluene layer was separated and washed until acid-free, and the toluene was removed by vacuum distillation.

(3) The toluene-free linear dimethyl silicone, containing two mol percent vinyl methyl silicone, was condensed or equilibrated with an equal volume of 60% sulphuric acid, using a tumbling action for agitation, for two to three hours at room temperature.

(4) The condensed dimethyl silicone, containing two mol percent vinyl methyl siloxane, was dissolved in toluene, and washed repeatedly to remove acid. The silicone oil was then precipitated from the toluene solution by addition of acetone, and the acetone removed by heat at low pressure (2 mm.) and a temperature of about (170° C.) providing a silicone oil having a viscosity of about 8000 centipoises at room temperature.

(5) The silicone oil was thermoset by using a catalyst consisting of 0.9 of 1% benzoyl peroxide at about 80° C. for three hours.

Obviously many modifications and variations of the present invention are possible in the light of the above teachings. It is therefore to be understood that within the scope of the appended claim the invention may be practiced otherwise than as specifically described.

What is claimed is:

The method of preparing a potting compound which contains silicon-bonded vinyl radicals and silicon-bonded vinyl monovalent hydrocarbon radicals comprising the steps of mixing dimethyl dichlorosilane and vinyl methyl dichlorosilane in weight proportions of approximately 50 to 1 with a substantially equal volume of dioxane to form a solution of the dichlorosilanes, hydrolyzing the solution of dichlorosilanes by the dropwise addition of a 1:2 by volume ratio of water:dioxane over a period of several hours to produce a solution containing 2 mol percent vinyl methyl siloxane, removing the solvent and excess water, equilibrating or condensing the solution containing 2 mol percent vinyl methyl siloxane at room temperature with an equal volume of 60% sulfuric acid and agitating for upwardly of two hours to produce a viscous yet pourable silicone oil, dissolving the equilibrated silicone oil in toluene to provide a toluene solution, washing the solution to remove acid, adding acetone to the washed solution to precipitate low molecular weight silicone oil, removing acetone by heating at a temperature of around 170° C. at low pressure until a silicone oil having a viscosity of approximately 8000 centipoises at room temperature is produced and then thermo-setting the silicone oil with a 0.9 percent of benzoyl peroxide catalyst at about 80° C. for approximately 3 hours.

References Cited in the file of this patent
UNITED STATES PATENTS

| | | |
|---|---|---|
| 2,405,041 | Mathes et al. | July 30, 1946 |
| 2,441,320 | Hyde | May 11, 1948 |
| 2,445,794 | Marsden | July 27, 1948 |
| 2,634,284 | Hyde | Apr. 7, 1953 |